United States Patent [19]

Rosengrant et al.

[11] Patent Number: 5,069,469
[45] Date of Patent: Dec. 3, 1991

[54] RECUMBENT CYCLE

[75] Inventors: Brent L. Rosengrant, Redmond; Glen T. Poss, Nine Mile Falls, both of Wash.; Malcolm M. Maccabee, Drain, Oreg.

[73] Assignee: H.P.E. Corporation, Kent, Wash.

[21] Appl. No.: 56,259

[22] Filed: Jun. 10, 1987

[51] Int. Cl.$^5$ .................. B62K 19/06; B62L 3/02; B62M 1/02; B62M 9/16

[52] U.S. Cl. .................. 280/288.1; 280/259; 280/261; 280/282; 280/288.2

[58] Field of Search .................. 280/288.1, 264, 282, 280/259, 260, 261, 263, 267, 269, 281 R, 281.1, 288; 74/501 R, 501 A, 519, 522.5, 523; 188/2 D, 24.11, 19, 20

[56] References Cited

U.S. PATENT DOCUMENTS

| | | | |
|---|---|---|---|
| 298,217 | 5/1884 | Lorenz | 280/264 |
| 306,498 | 10/1884 | Leddell | 280/264 |
| 332,263 | 12/1885 | Laughlin | 280/264 |
| 690,733 | 1/1902 | Jarvis | 280/261 |
| 2,182,345 | 12/1939 | Mieher | 280/261 |
| 2,481,683 | 9/1949 | Polacek | 280/282 |
| 2,986,406 | 5/1961 | Kahl | 280/287 |
| 3,429,584 | 2/1969 | Hendricks | 280/261 |
| 3,466,059 | 9/1969 | Kiernan | 280/261 |
| 3,580,349 | 5/1971 | Brennan | 280/281 |
| 3,666,035 | 5/1972 | Dudouyt | 180/210 |
| 3,722,612 | 3/1973 | Issigonis et al. | 280/275 |
| 3,753,577 | 8/1973 | Robinson | 280/261 |
| 3,913,929 | 10/1975 | Matsuura | 280/282 |
| 3,921,467 | 11/1975 | Matsuura | 280/282 |
| 3,960,392 | 6/1976 | Read | 280/282 |
| 4,108,460 | 8/1978 | Silva, Jr. | 280/281 LP |
| 4,168,846 | 9/1979 | Carren | 280/282 |
| 4,198,072 | 4/1980 | Hopkins | 280/281 LP |
| 4,272,095 | 6/1981 | Ptaszek | 280/282 |
| 4,283,070 | 8/1981 | Forrestall et al. | 280/281 LP |
| 4,333,664 | 6/1982 | Turner et al. | 280/281 LP |
| 4,335,899 | 6/1982 | Hiscock | 280/282 |
| 4,351,406 | 9/1982 | Lay | 280/267 |
| 4,432,561 | 2/1984 | Feikema et al. | 280/281 LP |
| 4,451,064 | 5/1984 | Perkins | 280/282 |
| 4,456,277 | 6/1984 | Carpenter | 280/282 |
| 4,469,343 | 9/1984 | Weatherford | 280/261 |
| 4,497,502 | 2/1985 | Forbes et al. | 280/281 LP |
| 4,502,705 | 3/1985 | Weaver | 280/261 |
| 4,548,421 | 10/1985 | Wiener | 280/281 LP |
| 4,580,802 | 4/1986 | Herman et al. | 280/267 |
| 4,592,563 | 6/1986 | Dean et al. | 280/281 LP |
| 4,634,137 | 6/1987 | Cocksedge | 280/282 |
| 4,659,098 | 4/1987 | Jacobson | 280/281 LP |
| 4,705,284 | 11/1987 | Stout | 280/281 LP |

FOREIGN PATENT DOCUMENTS

2117719 10/1983 United Kingdom ......... 280/281 LP

Primary Examiner—Mitchell J. Hill
Attorney, Agent, or Firm—Christensen, O'Connor, Johnson & Kindness

[57] ABSTRACT

Recumbent cycle (12) is supported by a pair of forward steerable wheels (16) and a single rear drivewheel (18) mounted on rear end portion of a frame structure (14) by a hub assembly (50) having an integral transmission and brake. A pair of side-mounted gimbal assemblies (170L, 170R) may be conveniently tilted laterally to steer wheels (16) in the same corresponding direction. The gimbal assemblies (170L, 170R) may be individually or in unison tilted in the forward direction to actuate the brake of hub assembly (50). Frame structure (14) includes a forward beam (34) telescopically engaged within a main beam (32) to vary the distance between a crank assembly (28) and a seat (20) to accommodate riders of different sizes.

19 Claims, 7 Drawing Sheets

RECUMBENT CYCLE

TECHNICAL FIELD

The present invention relates to human-powered vehicles, and more particularly to a recumbent, three-wheeled vehicle having a steering system and a braking system which are operated by a hand-actuated gimbal assembly.

BACKGROUND OF THE INVENTION

Bicycles have long been a common mode of human-powered transportation. Modern bicycles employ precision manufactured components, including pedal cranks, chains and drive sprockets, so that a high proportion of the energy applied to the pedals by the rider is transmitted to the rear drive wheel. Also, through the use of higher strength materials, modern bicycles are also much lighter in weight than in the past making them easier to pedal.

Nonetheless, bicycles do suffer from substantial drawbacks. For instance, because of the upright position of the bicycle rider, at higher speeds, i.e., over 25 m.p.h., a very high proportion of the effort expended by the rider is used to overcome wind resistance. Also, because the rider sits relatively high off the ground, hard braking can lead to severe skidding of the tires.

The foregoing drawbacks of conventional bicycles are overcome in recumbent cycles wherein the rider sits behind the foot pedals in a recumbent or reclining position in a seat which usually is provided with a backrest. Unlike in a bicycle in which the rider's legs extend downwardly in a generally vertical direction, in a recumbent cycle the rider's legs extend forwardly substantially parallel to the ground. As such the combined frontal area of a recumbent cycle and rider is typically substantially less than in a conventional bicycle, thus resulting in reduced wind resistance.

Also, because of the feet-forward riding position and the low center of gravity of the rider and vehicle, recumbent vehicles are typically safer than conventional bicycles. The rider can use his legs to brace himself during a collision to stay seated to avoid sliding or being pitched forward. In addition, the low center of gravity reduces the skidding of the wheels of the recumbent vehicle during hard braking. Further, the seat of a recumbent cycle typically supports more of the rider's body area, including his back, so that the weight of the rider is distributed over a larger surface for greater comfort. In a recumbent position the rider is able to apply greater thrust power to the pedals since his back and hips are braced by the seat. Moreover, during pedaling, the loads applied by the rider's body against the seat in reaction to the forces applied to the foot pedals by the rider's legs are transmitted to the seat through the hips and shoulders of the rider. This enables the upper torso and arms of the rider to remain relaxed while full power is being applied to the foot pedals.

Various types of recumbent vehicles are known, including recumbent bicycles are exemplified by U.S. Pat. Nos. 4,283,070, 4,333,664 and 4,659,098. A drawback of recumbent bicycles is that although the rider may be positioned at a lower elevation than in a conventional bicycle, the rider generally sits above the level of the smaller wheel of the bicycle, which usually is a substantial distance above the ground. As such, the combined center of gravity of the rider and bicycle may not be significantly lower than in a conventional bicycle. A further disadvantage of a recumbent bicycle is that it is more difficult to balance than a regular bicycle because of the recumbent position of the rider. Another type of recumbent vehicle is the recumbent tricycle. The foregoing disadvantages of recumbent bicycles are not present in recumbent tricycles since the rider typically sits between the forward and rearward wheels on a lowered frame rather than above the wheels in the case of a recumbent bicycle. Also, because three wheels are used, the difficulty of balancing a recumbent bicycle does not exist in a recumbent tricycle.

Recumbent tricycles have been constructed in various configurations. For instance, in one configuration the foot pedals are drivingly interconnected to one or two forward drive wheels with the steering accomplished through the rear wheel(s). Examples of such recumbent tricycles are disclosed in U.S. Pat. Nos. 3,960,392, 4,198,072 and 4,497,502. One disadvantage of steering the rear wheels of a recumbent tricycle is that the steering geometry, and thus the steering "effect", of the vehicle is different than that which riders are typically accustomed to from riding a bicycle or driving a car.

Other recumbent tricycle configurations including a "front drive - front steer" arrangement illustrated in U.S. Pat. No. 4,456,277 and a "rear drive - front and rear steer" configuration disclosed in U.S. Pat. No. 4,592,563. Both of these configurations are substantially more complicated than in recumbent tricycles in which the steering and driving functions of the vehicle are separated between the forward and rearward wheels.

In a further configuration, the front wheels of the recumbent tricycle are used for steering with the drive torque from the foot pedals being transmitted to the rear wheel. Examples of such recumbent tricycles are disclosed by U.S. Pat. Nos. 3,913,929 and 4,548,421.

Aspects of known recumbent tricycles that have not been significantly developed are the control systems used to steer the steerable wheels, actuate the vehicle's brakes and shift the multi-speed transmissions commonly employed in recumbent tricycles. Some recumbent tricycles merely employ a typical bicycle handlebar positioned either below the vehicle seat (see for instance aforementioned U.S. Pat. Nos. 4,198,072 and 4,456,277) or in front of the rider (see for instance aforementioned U.S. Pat. No. 4,548,421). Locating the handlebar below the seat makes the hand controls awkward and difficult to operate, whereas locating the handlebar in front of the rider can result in serious injuries if the rider accidentally slides or pitches forward into the handlebars and the hand controls mounted thereon.

In other recumbent tricycle designs, the steering controls are in the form of upright handles located on the sides of the frame and are interconnected to the front or rear steerable wheels through various types of linkage arrangements. While these steering control handles are conveniently located, they are not sophisticated or sufficiently developed enough to enable the rider to also actuate the brake by simply manipulating the same control handle nor do they permit the rider to shift the transmission while holding the control handles. Examples of such control handles are disclosed in the aforementioned U.S. Pat. Nos. 3,913,929, 3,960,392, 4,497,502 and 4,592,563. Another limitation of such control handles is that when used for steering they are tilted or pivoted only in the fore-and-aft direction which can lead to confusion as to the particular direction the handles are to be shifted when attempting to steer in a desired direction.

SUMMARY OF THE INVENTION

The foregoing drawbacks of the prior art are addressed by the present invention which concerns a recumbent, human-powered vehicle having a frame structure supported by at least one steerable wheel and by at least one drive wheel spaced along the frame structure from the steerable wheel. The brake system is operably associated with the drive wheel, or steerable wheel or both. A hand-operated gimbal assembly is mounted on the frame structure for both steering the steerable wheel and actuating the brake system. The gimbal assembly includes a first, manually graspable, gimbal structure rotatably interconnected with a second gimbal structure which in turn is rotatably mounted on the vehicle frame structure. By manual manipulation of the first gimbal structure, the gimbal assembly is tilted or pivoted laterally relative to the length of the frame structure thereby to rotate the steerable wheel in the same direction that the gimbal assembly is laterally tilted. By manipulation of the first gimbal structure, the gimbal assembly is also tilted or pivoted in a longitudinal direction relative to the length of the frame structure thereby to actuate the brake system.

In a further aspect of the present invention, a pair of gimbal assemblies are located on laterally opposite sides of the frame structure. The two gimbal assemblies are interconnected by a linkage whereby the gimbal assemblies are constrained to tilt or pivot in unison laterally relative to the length of the frame structure.

In another aspect of the present invention, three wheels are employed to support the frame structure, with two of the wheels being steering wheels and one of the wheels being a drive wheel. The two steering wheels are operably interconnected together and to the second gimbal structure of the gimbal assembly, with the second gimbal structure being mounted on a frame to pivot in the transverse direction relative to the length of the frame structure. The brake system is operably interconnected with the first gimbal structure which is mounted on the second gimbal structure to pivot about the second gimbal structure in a longitudinal direction relative to the frame structure.

In an additional aspect of the present invention, the frame structure includes an elongate, telescoping center beam assembly having a first, elongate, rectilinear main beam member supported by the steering and drive wheels. The center beam assembly also includes a second, elongated, rectilinear, forward beam telescopically engageable within the first beam member. A drive crank assembly, having a drive sprocket and foot pedals, is rotatably mounted on the forward beam member. The drive sprocket is interconnected with a driven sprocket through an endless chain thereby to transmit torque from the foot pedals to the driven wheel. The distance between a seat mounted on the main beam member and the foot pedals is selectively adjusted by extending and retracting the main and forward beam members relative to each other thereby to accommodate riders of different heights and sizes.

In accordance with yet another aspect of the present invention a system is provided for automatically taking up the slack in the drive chain as the center beam assembly is extended and retracted. The chain tensioning system includes an idler sprocket mounted on a carriage constrained to move toward and away from the drive sprocket along a guideway incorporated within the interior of the forward beam member. The carriage is resiliently biased in the direction away from the drive sprocket.

BRIEF DESCRIPTION OF THE DRAWINGS

One embodiment of the present invention is illustrated in the accompanying drawings, in which.

DETAILED DESCRIPTION

Figure 1:
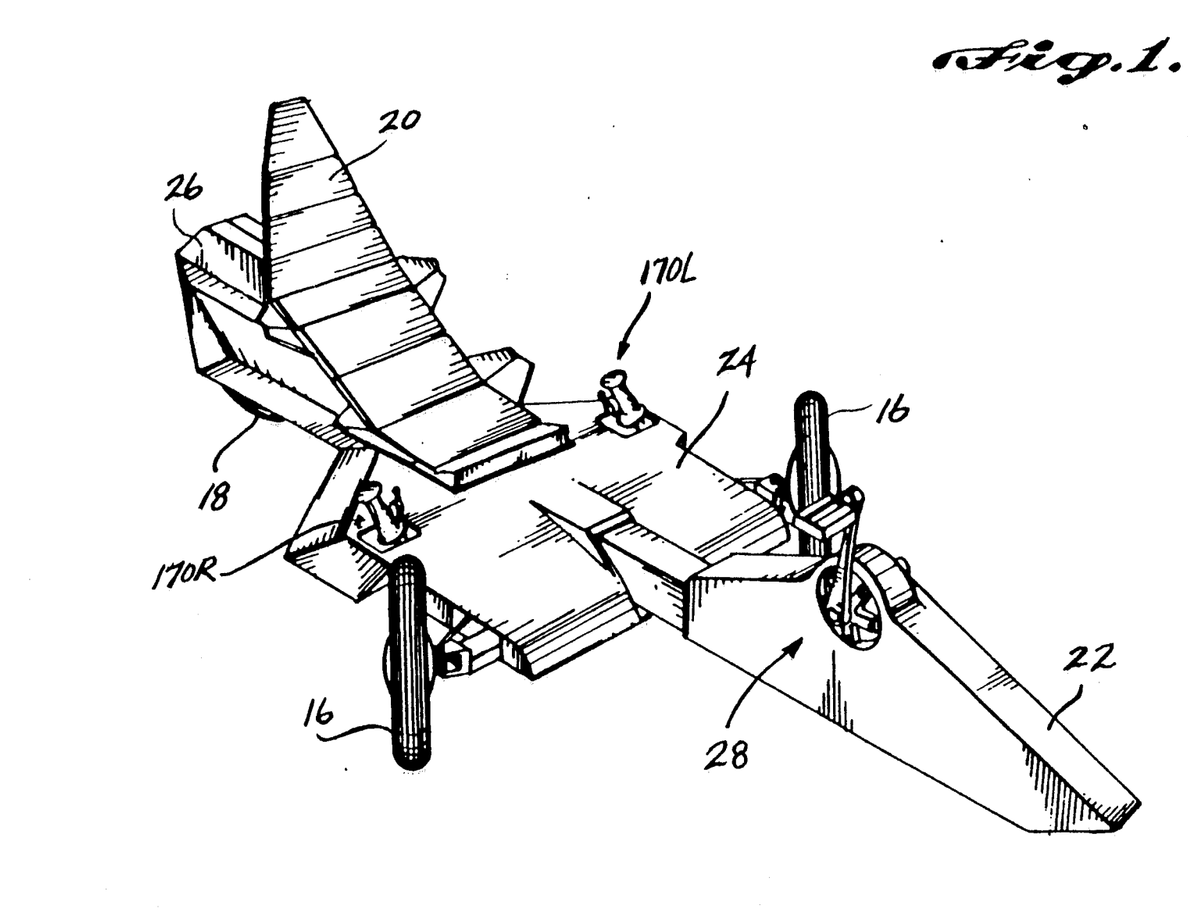
FIG. 1 is an isometric view of the recumbent, human-powered vehicle of the present invention as viewed from the forward end of the vehicle.
Figure 2:
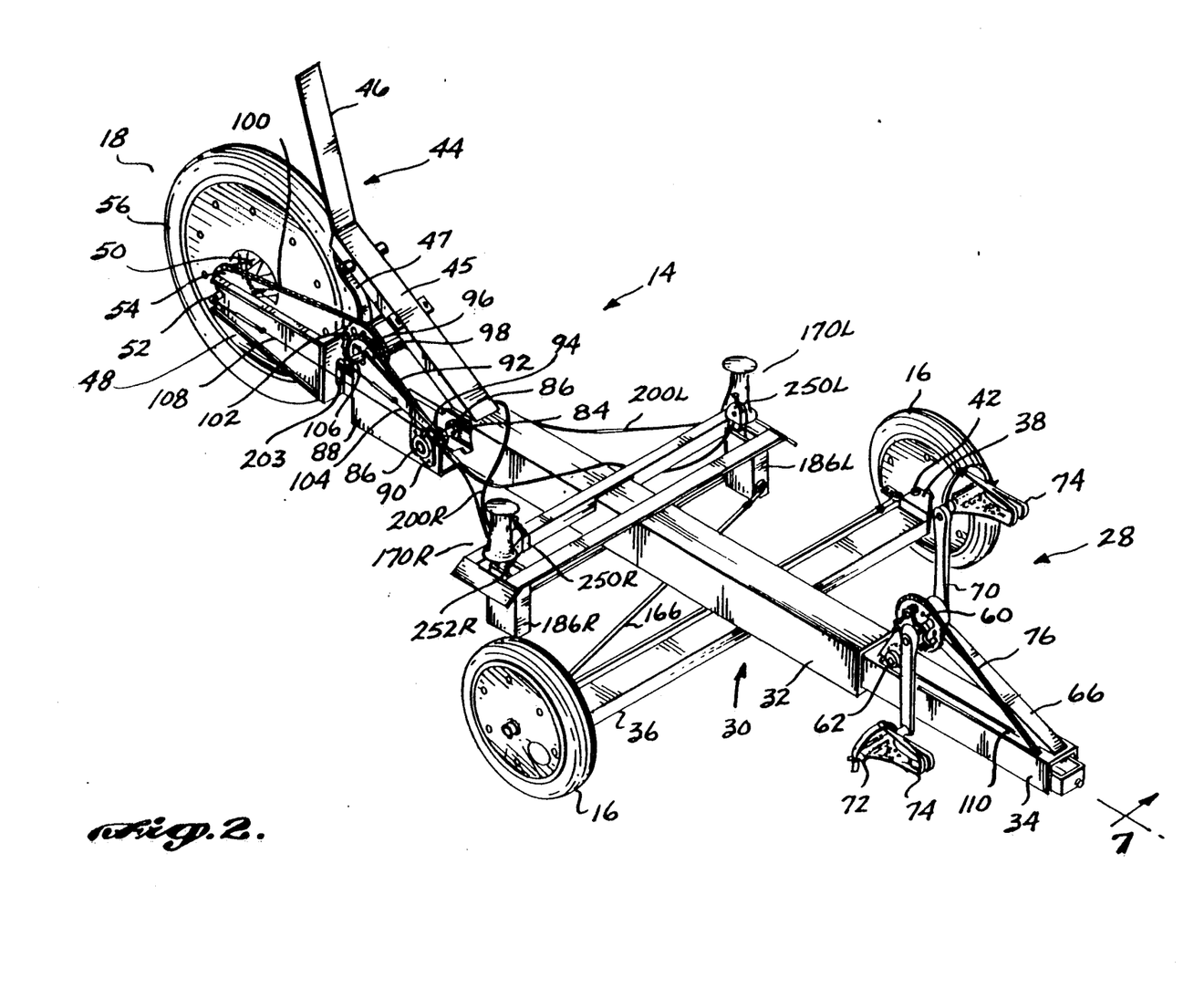
FIG. 2 is an isometric view similar to FIG. 1, but with the body panels removed.

Initially referring to FIGS. 1 and 2, a recumbent human-powered vehicle 12 constructed according to the present invention is illustrated as including a frame structure 14 supported by a pair of forward, steerable wheels 16 and a larger, single, rear drive wheel 18. A seat 20 and forward, intermediate and rearward body sections 22, 24 and 26, respectively, are mounted on the frame structure 14 to cover most of the frame structure, as shown in FIG. 1. Vehicle 12 is manually powered through a foot-operated drive system composed of crank assembly 28 mounted on the forward end of the frame structure to drive rear wheel 18.

Considering vehicle 12 of the present invention in more detail, frame structure 14 includes an elongate, central beam assembly 30 composed of an elongate, straight, tubular main beam 32 which is sized and shaped to telescopically receive a forward beam 34. A tubular axle beam 36 extends transversely beneath a forward portion of main beam 32. King pin brackets 38 are mounted on the ends of axle beam 36 to pivotally receive stub axles 40L and 40R. The stub axles 40L and 40R are connected to brackets 38 by king pins 42 which extend through close-fitting clearance holes formed in the upper and lower ears of the king pin brackets and through a close-fitting bore extending through the stub axles 40L and 40R. Axle beam 36 may be welded, bolted or otherwise rigidly attached to forward beam 34. The front wheels 16 are mounted on the spindle portions 43 of the stub axles 40L and 40R in a well-known manner.

Frame structure 14 also includes a seat support assembly 44 composed of a first diagonal support tube 45 extending upwardly and rearwardly from a rear portion of main bean-32 and an elongate headrest plate 46 extending in the upright direction from the upper end of support tube 45. A brace plate 47 extends upwardly from the rear end of main beam 32 to support the upper end of tube 45. Seat support assembly 44 supports an elongate, curved seat 20 which in turn supports the seat, back and head of a rider.

Rear drive wheel 18 is mounted on the rear end portion of beam assembly 30 by a U-shaped fork 48 extending rearwardly from the rear end of main beam 32. Rear wheel 18 is mounted on a hub assembly 50 which is attached to fork 48 by an axle 52. Ideally, hub assembly 50 is composed of a combination planetary transmission and brake of the nature commonly employed in heavy-duty bicycles. Exemplary, but non-limiting, examples of such hub assemblies include Model Nos. AW (three-speed) and S-5 (five-speed) manufactured by T. I. Sturmey-Archer, Ltd., Nottingham, England. A driven sprocket 54 is secured to hub assembly 50 to transmit torque to the rear wheel 18 from crank assembly 28. Preferably, rear wheel 18 includes a pneumatic rubber tire 56 to absorb shock and vibration during vehicle travel while also providing a high level of traction.

Ideally the main components of frame structure 14, including beam assembly 30, axle beam 36, seat support 43 and rear fork 48, are composed of high strength, lightweight metallic material to provide vehicle 12 with sufficient structural integrity while minimizing the weight of the vehicle. Exemplary, but non-limiting examples of such materials include aluminum alloy 6061 and 6063.

Figure 7:
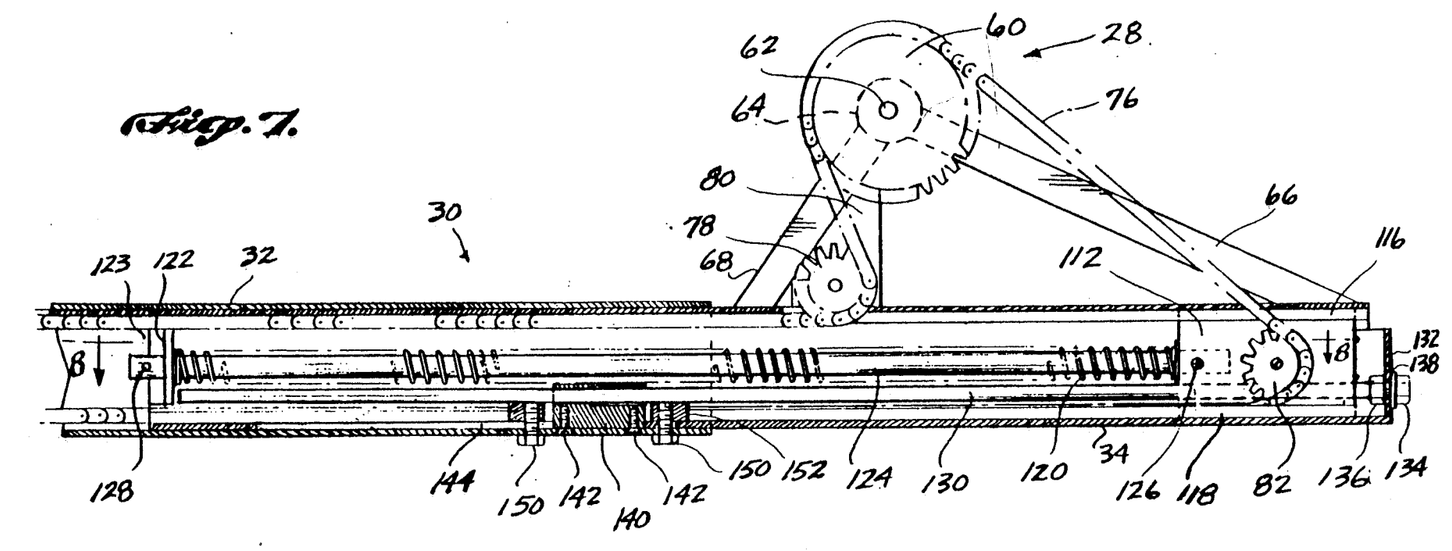
FIG. 7 is an enlarged, fragmentary, side-elevational cross-sectional view of FIG. 2 taken substantially along line 7—7 thereof.
Figure 8:
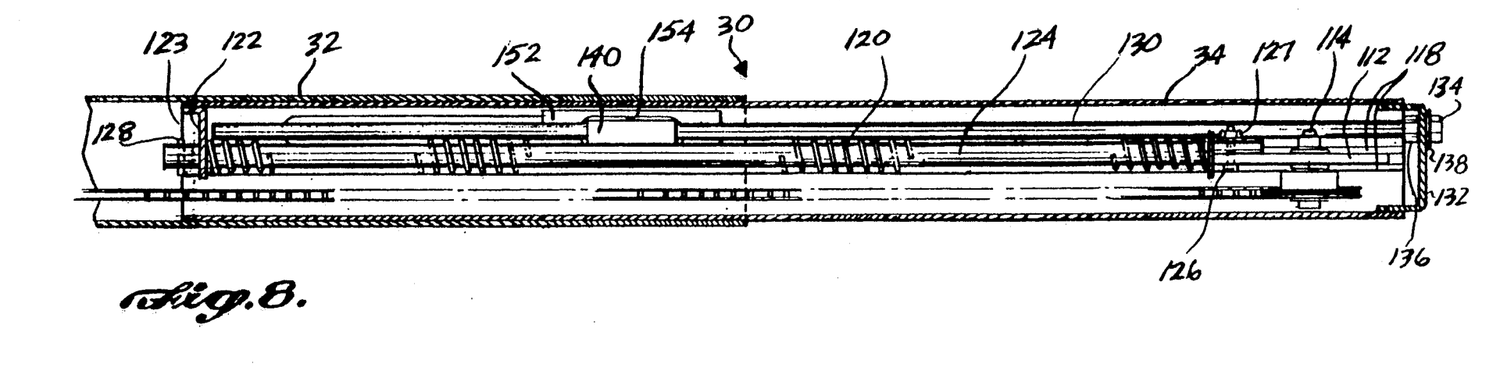
FIG. 8 is an enlarged, fragmentary, top cross-sectional view of FIG. 7.

As noted above, forward beam 34 is sized and shaped to telescopically engage within main beam 32 to vary the distance between seat 20 and crank assembly 28 to accommodate riders of different heights and sizes. Referring specifically to FIGS. 2, 7 and 8, crank assembly 28 includes a drive sprocket 60 securely mounted on a drive shaft 62 which in turn is mounted on a hub 64 by bearings, not shown, in a standard manner. Hub 64 is supported at an elevation above forward beam 34 by tubular struts 66 and 68 extending diagonally upwardly from the upper surface of forward beam 34. A pair of pedal cranks 70 are secured to the ends of drive shaft 62 in a well-known manner, and foot pedals 72 are mounted on the distal ends of cranks 70. Standard toe retainers 74 are employed in conjunction with pedals 72 in a well-known manner.

A forward drive chain 76 is trained over drive sprocket 60 and over the forward and bottom portions of an idler sprocket 78 which is rotationally mounted on a generally triangularly-shaped plate 80 extending upwardly from the upper surface of forward beam 34 to intersect with the underside of strut 68. From the opposite side of drive sprocket 60, chain 76 trains around a take-up sprocket 82 which, as described more fully below, is resiliently loaded in the forward direction to automatically take up the slack in chain 76 upon extension and retraction of beam assembly 30. From take-up sprocket 82, chain 76 extends rearwardly through the interior of forward beam 34 and main beam 32 to a sprocket 84 disposed within the interior of main beam 32 and mounted on a jack shaft 86. The outer ends of jack shaft 86 are mounted on the sidewalls of an upwardly extending, U-shaped bracket 88 through the use of flange bearings 90. Bracket 88 is welded or otherwise securely attached to the underside of main beam 32.

An intermediate endless chain 92 interconnects a sprocket 94, that is mounted on jack shaft 86 at a location between the upright wall of bracket 88 and the adjacent sidewall of main beam 32, to an input sprocket 96 of a transmission 98. A third endless chain 100 interconnects a larger output sprocket 102 of transmission 98 with drive sprocket 54 of rear hub assembly 50. To provide a step-up in the drive ratio between drive sprocket 60 and driven sprocket 54, the output sprocket 94 of jack shaft 86 is larger in diameter than the corresponding input sprocket 84. Likewise, the output sprocket 102 of transmission 98 is of a larger diameter than the corresponding input sprocket 96. It is to be understood that the relative sizes of drive sprocket 60 and driven sprocket 54, of jack shaft input sprocket 84 and output sprocket 94, and of transmission input sprocket 96 and output sprocket 102, may be selectively varied to provide a desired overall nominal drive ratio between drive sprocket 60 and driven sprockets 54. As with hub assembly 50, transmission 98 is designed to provide various drive ratios between input sprocket 96 and output sprocket 102, for instance, through a planetary gearing system, not shown, located within the interior of the transmission.

The transmission 98 is shifted by extension and retraction of a shifter line 104 extending outwardly from the transmission through the center of transmission shaft 106 which also mounts the transmission 98 on the upper rearward portion of brackets 88. Likewise, the transmission incorporated into rear hub assembly 50 is shifted by extension and retraction of a shifter line 108 extending outwardly from the interior of hub assembly 50 through the center of axle 52. It is to be understood that vehicle 12 of the present invention may be constructed without transmission 98 and perhaps without a transmission incorporated into rear hub assembly 50 without departing from the spirit or scope of the present invention. If transmission 98 is eliminated, output sprocket 94 of jack shaft 86 may be drivingly interconnected directly to driven sprockets 54 through a chain of an appropriate length, not shown.

Although preferably transmission 98 is of the same type as used in hub assembly 50, it can be of other types such as a derailer gear system. Hub assembly 50 likewise can be composed of a derailer gear system. Exemplary, but non-limiting, examples of commercially available transmissions which can be used as transmission 98 include Model Nos. SAB-3 (three-speed) and AT-5 (five-speed) manufactured by T. I. Sturmey-Archer, Ltd.

From the input sprocket 84 of the jack shaft 86, the forward drive chain 76 extends forwardly through the interiors of the main beam 32 and the forward beam 34 to the idler sprocket 78 and then upwardly through an elongate slot 110 formed in the upper wall of forward beam 34, around drive sprocket 60, then downwardly through the forward end of the slot 110 to extend around the take-up sprocket 82. As most clearly shown in FIGS. 7 and 8, the take-up sprocket is mounted on a carriage in the form of slide plate 112 through a stub axle 114 extending longitudinally outwardly from the slide plate. The slide plate 112 is constrained to slide fore and aft within the interior of forward beam 34 by a pair of spaced-apart flanges 116 depending downwardly from the upper wall of the forward beam to define a tract for receiving the upper edge of the slide plate and by a pair of lower spaced-apart flanges 118 extending upwardly from the bottom wall of the forward beam to define a tract for closely receiving the lower edge portion of the slide plate. Preferably the slide plate is made from a high strength plastic based material having sufficient structural integrity to withstand the loads imposed on the plate by sprocket 82 while also exhibiting low coefficient of friction with forward beam 34. Alternatively, the slide plate can be composed of a suitable metallic material, such as a bronze alloy.

Sprocket 82 is resiliently loaded in the forward direction to automatically take up any slack in drive chain 76 by use of an elongate compression spring 120 which pushed forwardly agains the rear edge portion of slide plate 112. The rear end of compression spring 120 abuts against the upright transverse wall 122 of a bracket 123 disposed within the interior of forward beam 34. Compression spring 120 is constrained and guided by an elongate rod 124 having its forward end attached to slide plate 112 by cross-pin 126 which extends through clearance holes formed in both rod 124 and slide plate 112 to engage a fastener, such as nut 127. The rearward end of rod 124 extends through a clearance hole formed in upright wall 122. Rod 124 is prevented from forwardly disengaging from upright wall 122 by a roll pin 128 snugly engaged within a transverse hole formed in the rearward end portion of the rod 124.

Figure 9:
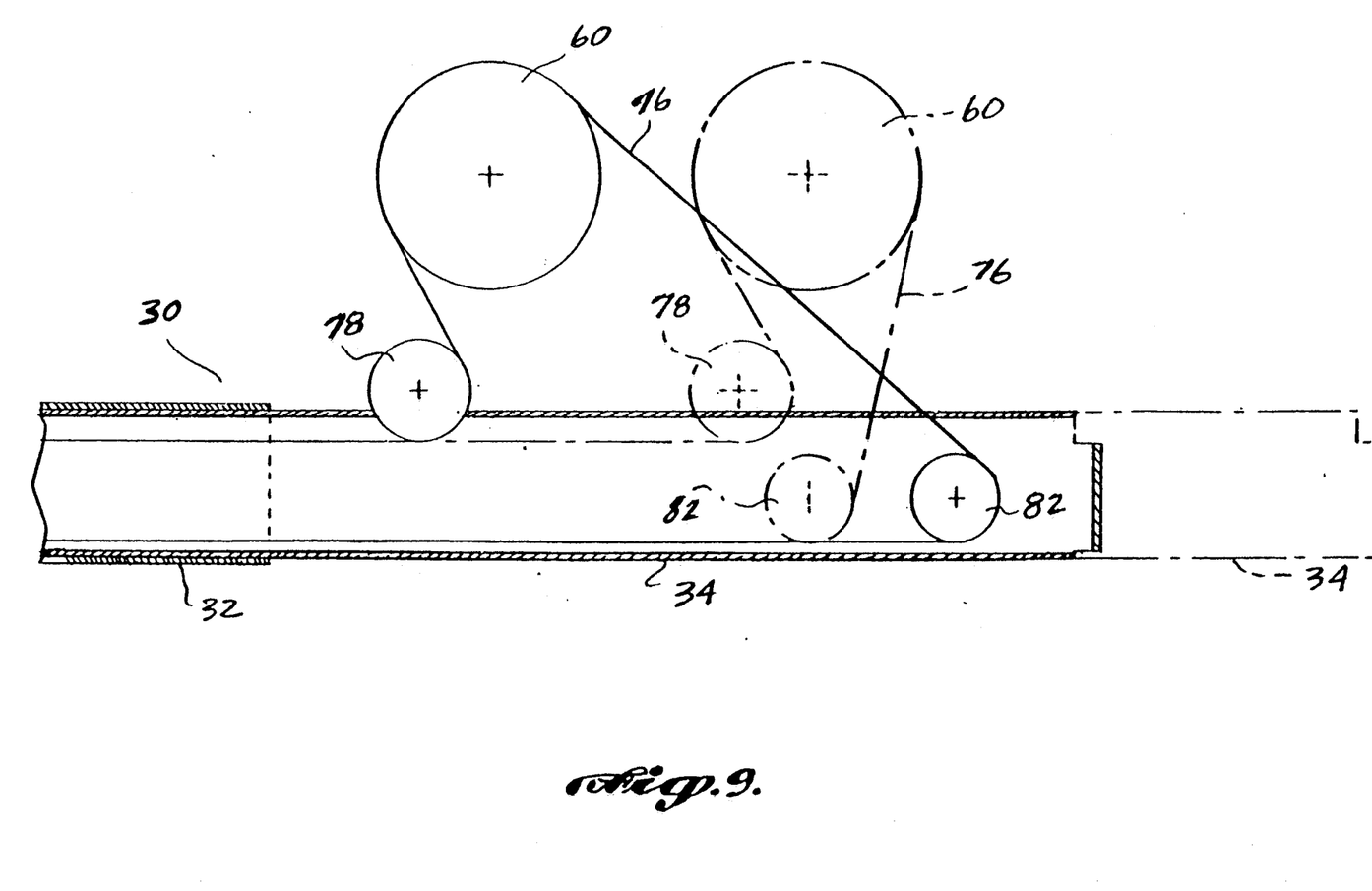
FIG. 9 is a schematic view corresponding to FIG. 7 illustrating the relative engagement of the forward and main beams of the vehicle frame assembly and the relative positions of the drive and take-up sprockets when the frame assembly is in fully extended and retracted positions.

As noted previously, forward beam 34 is adapted to telescope relative to main beam 32 thereby to selectively adjust the distance between seat 20 and crank assembly 28. In one preferred embodiment of the present invention, this adjustment is accomplished through an elongate lead screw 130 having a forward end portion extending through a clearance hole formed in a U-shaped end cap 132 secured to the forward end of forward beam 34 to terminate at an enlarged hexagonal head 134 disposed on the forward side of end cap 132. The lead screw 130 is constrained against longitudinal movement relative to the end cap 132 by its enlarged hexagonal head 134 and by an enlarged shoulder 136 disposed adjacent of the opposite or rearward face of end cap 132. A flat washer 138 is disposed between head 134 and the adjacent forward surface of end cap 132. The rearward end portion of lead screw 130 is threadably engaged with an anchor block 140 secured to the bottom wall of main beam 32 by appropriate hardware members, for instance screws 142. The anchor block 140 extends upwardly from the bottom wall of main beam 32 through an elongate slot 144 formed in the bottom wall of forward beam 34 into the interior of the forward beam. It will be appreciated that as lead screw 130 is rotated, for instance by wrenching on enlarged head 134, the forward beam 34 is extended or retracted relative to the main beam depending on the direction in which the lead screw is rotated. FIG. 9 illustrates the relative location of drive sprocket 60 and take-up sprocket 82 when the forward beam is in fully retracted position (shown in solid line) and in fully extended position (shown in broken line). When the forward beam is in extended position, the increased distance along the length of the beam assembly 30 between jack shaft sprocket 84 and drive sprocket 60 is accommodated by a decrease in the distance between the drive sprocket and the take-up sprocket and a corresponding compression of spring 120.

After the forward beam 34 has been adjusted to a desired engagement with the main beam 32, the two beams are securely clamped together by clamping bolts 150 which extend upwardly through close-fitting clearance holes formed in the bottom wall of the main beam 34, through slot 144 to engage within threaded holes formed in a rectangular nut plate 152 that overlies the lower wall of forward beam 34. As shown in FIG. 7, the clamping plate 152 has a central clearance slot 154 formed therein through which anchor block 140 extends. When clamping bolts 150 are loosened, forward beam 34 can be telescopically adjusted relative to the main beam 32 by rotation of lead screw 130; however, when the clamping screws are tightly engaged with nut plate 42, the forward and main beams are securely held together thereby to prevent any accidental telescopic movement therebetween.

Main beam 32 and forward beam 34 are illustrated in the figures as being of rectilinear shape, i.e., square or rectangular in cross section and substantially straight in length. This enables the two beam members to telescope a substantial distance relative to each other and also prevents the forward beam 34 from rotating about its length relative to the main beam 32. Nonetheless the forward and main beams could be constructed from nontubular material or from tubular material of other cross-sectional shapes without departing from the spirit or scope of the present invention.

Next, referring specifically to FIGS. 2-5, the steering system for front wheels 16 includes track arms 160L and 160R that extend rearwardly from the left and right stub axles 40L and 40R. The track arms 160L and 160R of the two stub axles are interconnected by a track rod 162 to cause the stub shafts to pivot in unison about king pins 42. As is common in the vehicle art, ball joint assemblies 164 are secured to the ends of track rod 162 to connect the ends of the track rod to track arms 160L and 160R.

A diagonally-disposed drag link 166 interconnects the rearward portion of right-hand track arm 160R to a left steering/braking gimbal assembly 170L. The right-hand end portion of drag link 166 is connected to track arm 160R through the use of ball joint assembly 168. Left gimbal assembly 170L and right gimbal assembly 170R are mounted on opposite ends of a cross frame 174 which is transversely mounted on main beam 32 at a location beneath intermediate body section 24 and the forward portion of seat 20. Cross frame 174 includes a pair of spaced-apart cross arms 176 which are secured to main beam 32 by any appropriate means, such as by weldments or hardware members, not shown. Sloped end plates 178 interconnect the adjacent end portions of the cross arms and also underlie and support the side portions of the intermediate body section 24.

Because the gimbal assemblies 170L and 170R are constructed essentially identically, the following description will be for gimbal assembly 170L, with the understanding that such description is also applicable to gimbal assembly 170R. Gimbal assembly 170L includes a first member in the form of a handle 180 constructed with a tubular, nominally upright lever 182 having its upper end portion engaged within the interior of a manually graspable grip 184, which is shaped to be comfortably and securely gripped by the rider's hand.

Figure 4:
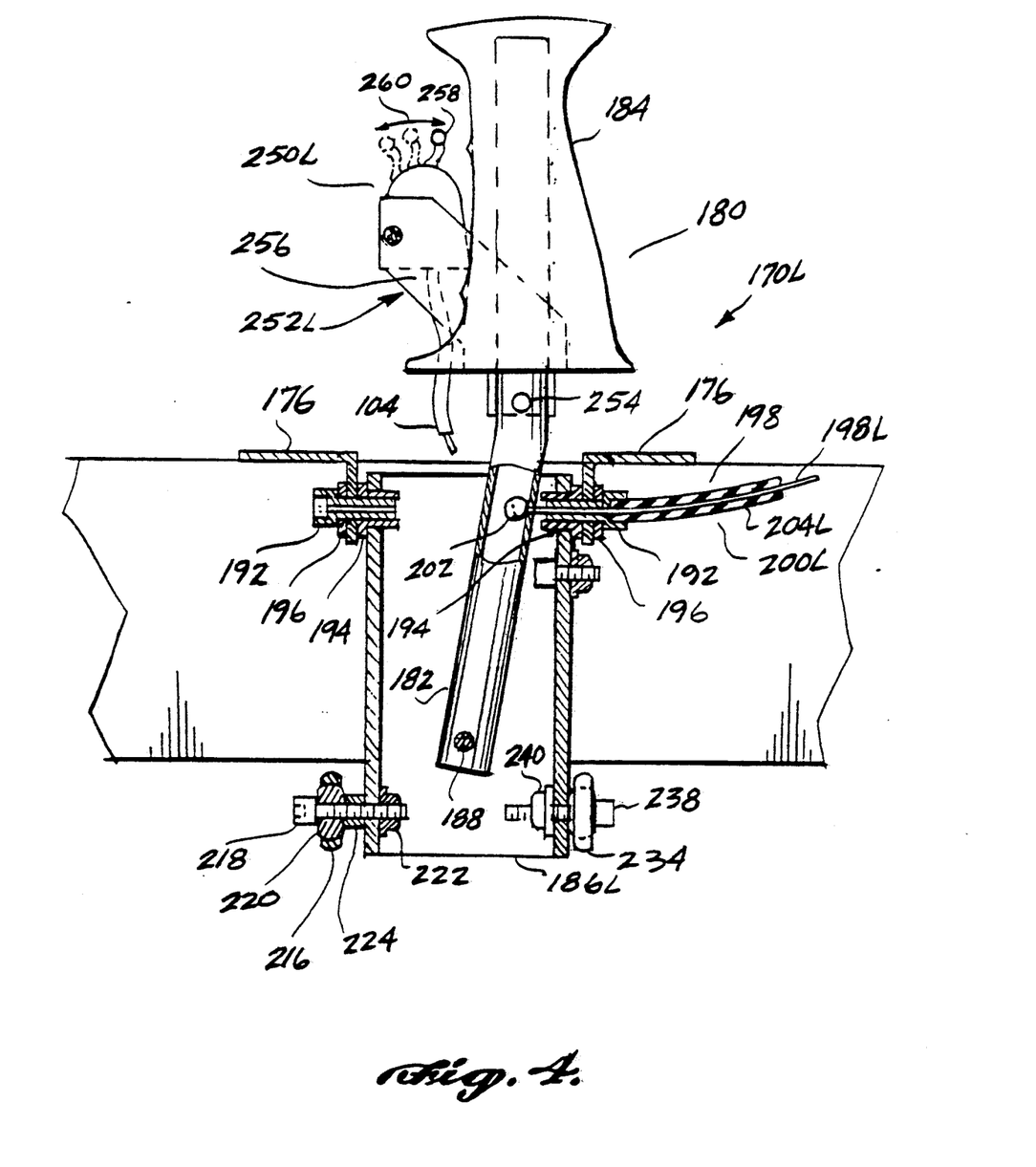
FIG. 4 is an enlarged, fragmentary cross-sectional view illustrating the construction of a hand-operable gimbal assembly of the present invention utilized to control the steering, braking and shifting of the transmission of the recumbent vehicle, taken substantially along lines 4—4 of FIG. 3.

As shown in FIG. 4, the lower end of handle 180 is pinned to a second gimbal member in the form of a rectangular, hollow housing 186L nominally disposed in an upright position and having an open top and bottom (FIG. 4). A headed cross pin 188 extends through aligned, close-fitting clearance holes formed in the lower, central sidewall portions of housing 186 and through the corresponding close-fitting clearance hole formed in the lower end portion of lever 182. A cotter key 190 is employed to prevent disengagement of cross pin 188 from housing 186L and lever 182. Ideally, the outer diameter of lever 182 is slightly smaller than the interior width of housing 186L so that handle 180 is free to pivot within housing 186L about cross pin 188 in the fore-and-aft directions relative to the length of the frame structure 14 as illustrated by arrows 191 in FIG. 5, while at the same time handle 182 is constrained by the sidewalls of housing 186L to prevent substantially any relative movement between the handle and housing 186L in the transverse direction relative to the length of the frame structure, i.e., in the direction along the length of cross pin 188. Housing 186L is closely receivable between the two cross arms 176 of cross frame 174, with the upper end portion of the housing being pivotally pinned to the upright walls of the L-shaped cross arms by hollow pins 192 that extend through close-fitting clearance holes formed in the cross arms to engage with threaded nuts 194 disposed within aligned openings formed in the opposite edge walls of housing 186L. Lock washers 196 are provided to reduce the possibility that pins 192 will become accidentally disengaged from nuts 194.

Figure 5:
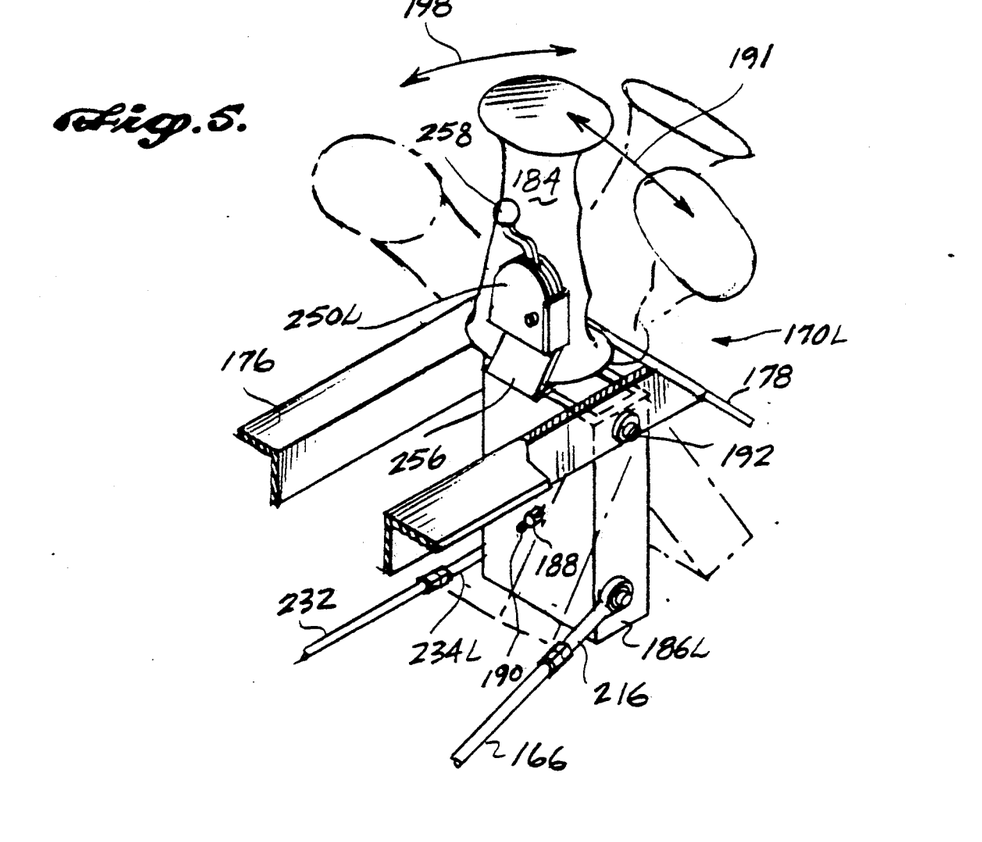
FIG. 5 is an enlarged, fragmentary isometric view of the gimbal assembly illustrated in FIG. 4.

As illustrated in FIG. 5, by the foregoing construction, when handle 184 is tilted or pivoted in the transverse direction relative to the length of frame structure 14, gimbal assembly 170L is correspondingly tilted or pivoted in the transverse direction about an axis of rotation defined by aligned pins 192, as illustrated by arrow 198. It will be appreciated that as gimbal 170L is being rocked or pivoted in a transverse direction, handle 180 may simultaneously be rocked or pivoted in the longitudinal direction relative to housing 186L about pin 188.

Figure 6:
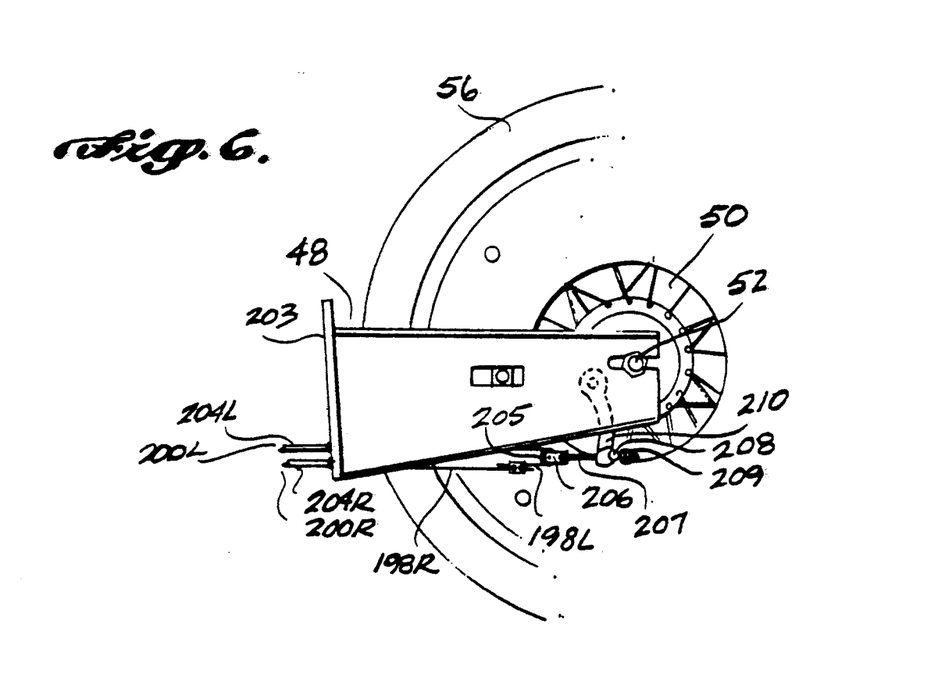
FIG. 6 is an enlarged, fragmentary side-elevational view of FIG. 3, taken substantially along line 6—6 thereof.

Gimbal assemblies 170L and 170R may be used to simultaneously steer and brake vehicle 12. The braking function is accomplished by pivoting handle 180 in the forward direction as indicated by arrow 191 in FIG. 5 thereby to exert a forward pull on the interior cable 198L of brake cable assembly 200L, which interior cable, as shown in FIG. 4, extends through hollow pin 192, into housing 186L and through a close-fitting opening formed in handle 182. An enlarged retaining head 202 is swagged, or otherwise fixedly attached, to the forward end of cable 198L to prevent it from being disengaged from lever 182. Brake cable assembly 200L extends rearwardly from gimbal assembly 170L along the left-hand side of main beam 32 (FIG. 3) through a counterbore formed in the forward wall 203 of fork 48. The forward end of the outer sheath 204L of brake assembly 200L abuts against the bottom of a counterbore formed in the head of pin 192 while the rear end of the sheath abuts against the bottom of the counterbore formed in wall 203. As shown in FIG. 6, from wall 203 the brake cable 198L extends rearwardly around a take-up pulley 205 rotatably mounted on a clevis 206 and then forwardly to connect with the rear end of brake cable 198R of brake cable assembly 200R leading to the right-hand gumbal assembly 170R. Clevis 206 is connected to the forward end of an elongate threaded rod 207. Rod 207 extends rearwardly from clevis 206 to extend through a transverse hole formed in a barrel connector 208 to engage a take-up nut 209. Barrel connector 208 rests within close-fitting, rearwardly open slots formed within the legs of a brake actuating lever 210 of hub assembly 50. By the foregoing construction, the brake associated with the rear wheel hub assembly 50 may be actuated by pivoting the handle 180 of either or both gimbal assemblies 170L and 170R in the forward direction.

Figure 3:
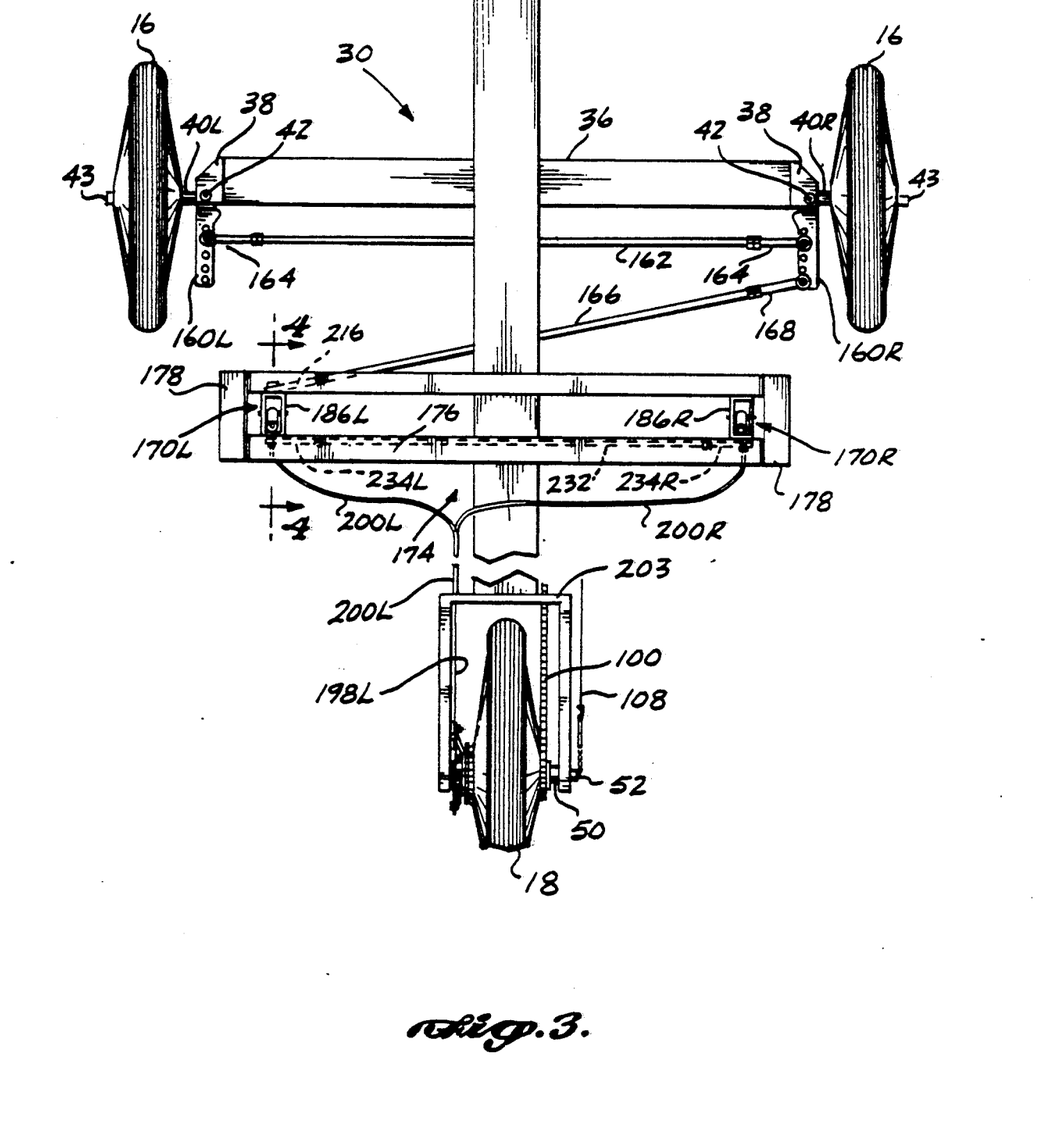
FIG. 3 is an enlarged, fragmentary plan view of FIG. 2 specifically illustrating the steering and braking systems.

As noted above, gimbal assemblies 170L and 170R are also utilized to steer vehicle 12. To this end, the rearward or left end of tie rod 166, FIG. 3, is connected to the lower forward end wall of housing 186L by a ball joint assembly 216. A threaded screw 218 extends through a center opening formed in a ball 220 of assembly 216 to engage a nut 222. A spacer 224 is employed to space the ball joint assembly 216 a short distance forwardly of the forward end wall of housing 186L to avoid any interference between the ball joint assembly and the housing since tie rod 166 is disposed diagonally relative to housing (FIG. 3).

As most clearly shown in FIG. 3, the housings 186L and 186R of ball joint assemblies 170L and 170R, respectively, are linked together by a transverse tie rod 232 to rotate transversely in unison. Gimbal assemblies 234L and 234R interconnect the tie rod 232 to the housings 186L and 186R, respectively. As shown in FIG. 4, the ball joint assemblies 234L and 234R are attached to the housings 186L and 186R, respectively, by threaded screws 238 which engage nuts 240.

To steer the vehicle 12, the rider uses the hand grips 184 to tilt or swing the gimbal assemblies 170L and 170R to the right or left to turn the vehicle 12 in the corresponding direction. Because vehicle 12 is turned in the same direction that the gimbal assemblies 170L and 170R are tilted, there is little likelihood that a rider will inadvertently steer the vehicle in the wrong direction. Moreover, as can be appreciated, vehicle 12 can be simultaneously steered and braked by the use of one or both of the gimbal assemblies 170L and 170R.

As shown most clearly in FIGS. 1 and 2, gimbal assemblies 170L and 170R are conveniently located on the opposite sides of intermediate body section 24 at the front of seat 20 within convenient reach of a rider. By placing the gimbal assemblies at these locations, it is unlikely a rider will be accidentally injured by striking against the gimbal assemblies during hard braking or cornering as might be the case if a standard steering wheel or handlebar were located in front of seat 20.

Next, referring specifically to FIGS. 2, 4 and 5, transmission 98 and the transmission associated with hub assembly 50 are shifted by shifter lever assemblies 250L and 250R mounted on handles 180 of gimbal assemblies 170L and 170R, respectively, by brackets 252L and 252R connected to levers 182 by cross pins 254 (FIG. 4). Brackets 252L and 252R have upper portions 256 extending upwardly alongside grip 184 to support shifter lever assemblies 250L and 250R in proper position to enable the rider to conveniently actuate shifter levers 258 with his thumbs while still tightly holding grips 184. As illustrated in FIG. 2, the shifter lever assembly 250L mounted on left-hand gimbal assembly 170L is utilized to shift transmission 98 whereas the shifter lever assembly 250R mounted on right-hand gimbal assembly 170R is employed to shift the transmission associated with rear hub assembly 50. Of course, the two shifter lever assemblies can be connected oppositely without departing from the spirit or scope of the present invention.

Transmission 98 and the transmission associated with rear hub assembly 50 are shifted from one gear to another by movement of shifter levers 258 in the fore-andaft direction (as illustrated by arrow 260 in FIG. 4) by the use of the rider's thumb. It will be appreciated that shifter levers 258 are easily operated by the rider while holding onto grips 184, thereby reducing the possibility that the rider will lose control of vehicle 12 while shifting transmission 98 or the transmission associated with hub assembly 50.

As will be apparent to those skilled in the art to which the invention is addressed, the present invention may be embodied in forms other than those specifically disclosed above without departing from the spirit or essential characteristics of the invention. The particular embodiment of the vehicle 12 described above, is therefore to be considered in all respects as illustrative and not restrictive. The scope of the invention is as set forth in the appended claims, rather than being limited to the example of the vehicle 12 set forth in the foregoing description.

The embodiments of the invention in which an exclusive property or privilege is claimed are defined as follows:

1. A recumbent, human powered vehicle comprising:
   (a) a frame structure having a forward end portion and a rearward end portion;
   (b) at least one steerable wheel;
   (c) means for rotatably mounting said steerable wheel on said frame structure;
   (d) at least one drive wheel rotatably mounted on said frame at a location longitudinally spaced along said frame from said steerable wheel and in constant contact with the ground;
   (e) a manually operable drive system drivingly interconnected with said drive wheel;
   (f) brake means operably associated with said drive wheel, said brake means including a braking surface rotating with said drive wheel and a friction assembly connected to said frame structure for frictionally engaging said braking surface;
   (g) a hand-operable steering and braking gimbal assembly, comprising a hand-graspable, first gimbal structure rotatably interconnected with a second gimbal structure, said second gimbal structure rotatably mounted on said frame structure whereby upon manual manipulation of said first gimbal structure, said gimbal assembly is tiltable laterally relative to said frame structure about an axis extending generally longitudinally relative to said frame structure, and is tiltable in the longitudinal direction relative to said frame structure about an axis extending generally laterally to said frame structure;
   (h) first interconnection means operably interconnecting said means for rotatably mounting said steerable wheel on said frame structure to one of said first and second gimbal structures, whereby the steerable wheel is rotated in the direction that said gimbal assembly is laterally tilted upon manual manipulation of said first gimbal structure;
   (i) second interconnection means operably connecting said brake means with the other of the first and second gimbal structures, whereby the brake means are actuated upon the tilting of said gimbal assembly in the longitudinal direction upon manual manipulation of said first gimbal structure;
   (j) pair of gimbal assemblies located at laterally opposite sides of said frame structure;
   (k) linkage means interconnecting said gimbal assemblies to constrain said gimbal assemblies to tile in unison laterally relative to the length of said frame structure; and
   (l) wherein said second interconnection means having means interconnecting both of said gimbal assemblies to said brake means to actuate said brake means by the tilting of either or both of said gimbal assemblies in the longitudinal direction by manual manipulation of either or both corresponding first gimbal structures.

2. A recumbent, human powered vehicle, comprising:
   (a) a frame structure having a forward end portion and a rearward end portion;
   (b) at least one steerable wheel;
   (c) means for rotatably mounting said steerable wheel on said frame structure;
   (d) at least one drive wheel rotatably mounted on said frame at a location longitudinally spaced along said frame from said steerable wheel and in constant contact with the ground;
   (e) a manually operable drive system drivingly interconnected with said drive wheel;
   (f) brake means operably associated with said drive wheels, said brake means including a braking surface rotating with said drive wheel and a friction assembly connected to said frame structure for frictionally engaging said braking surface;
   (g) a pair of hand-operable steering and braking gimbal assemblies located on laterally opposite sides of said frame structure, each of said gimbal assemblies comprising a hand-graspable, first gimbal structure rotatably mounted on a second gimbal structure to tilt about said second gimbal structure in the longitudinal direction relative to said frame structure; said second gimbal structure rotatably mounted on said frame structure to tilt about the frame structure in a transverse direction relative to the length of the frame structure, whereby upon manual manipulation of said first gimbal structure said gimbal assembly is tiltable laterally relative to said frame structure about an axis extending generally longitudinally relative to said frame structure, and is tiltable in the longitudinally direction relative to said frame structure about an axis extending generally laterally to said frame structure;
   (h) linkage means interconnecting said second gimbal structures of said gimbal pair to pivot in unison in a transverse direction relative to said frame structure;
   (i) first interconnection means operably interconnecting said means for rotatably mounting said steerable wheel on said frame structure to one of said first and second gimbal structures of one of the gimbal assemblies, whereby the steerable wheel is rotated in the direction that said gimbal assembly is laterally tilted upon manual manipulation of said first gimbal structure;
   (j) second interconnection means operably connecting said brake means with the other of the first and second gimbal structures of said gimbal assembly, whereby the brake means are actuated upon the tilting of said gimbal assembly in the longitudinal direction upon manual manipulation of said first gimbal structure;
   (k) wherein said second interconnection means interconnecting said first gimbal structure with said brake means;

(l) wherein said first interconnection means interconnecting said second gimbal structure with said steerable wheels; and, (m) wherein said second interconnection means having means interconnecting the first gimbal structures of both gimbal assemblies with said brake means to actuate said braking means by the tilting of one or both of the first gimbal structures in the longitudinal direction.

3. A recumbent, human powdered vehicle, comprising:

(a) a frame structure having a forward end portion and a rearward end portion;

(b) at least one steerable wheel;

(c) means for rotatably mounting said steerable wheel on said frame structure;

(d) at least one drive wheel rotatably mounted on said frame at a location longitudinally spaced along said frame from said steerable wheel and in constant contact with the ground;

(e) a manually operable drive system drivingly interconnected with said drive wheel;

(f) brake means operably associated with said drive wheel, said brake means including a brake surface rotating with said drive wheel and a friction assembly connected to said frame structure for frictionally engaging said brake surface;

(g) a pair of hand-operable steering and braking gimbal assemblies located on laterally opposite sides of said frame structure, each of said gimbal assemblies comprising a hand-graspable, first gimbal structure rotatably mounted on a second gimbal structure to tilt about said second gimbal structure on the longitudinal direction relative to said frame structure, said second gimbal structure rotatably mounted on said frame structure to tilt about the frame structure in a transverse direction relative to the length of the frame structure, whereby upon manual manipulation of said first gimbal structure said gimbal assembly is tiltable laterally relative to said frame structure about an axis extending generally longitudinally relative to said frame structure, and is tiltable in the longitudinal direction relative to said frame structure about an axis extending generally laterally to said frame structure;

(h) first interconnection means operably interconnecting said means for rotatably mounting said steerable wheel on said frame structure to one of said first and second gimbal structures of one of the gimbal assemblies, whereby the steerable wheel is rotated in the direction that said gimbal assembly is laterally tilted upon manual manipulation of said first gimbal structure;

(i) second interconnection means operably connecting said brake means with the other of the first and second gimbal structures of said gimbal assembly, whereby the brake means are actuated upon the tilting of said gimbal assembly in the longitudinal direction upon manual manipulation of said first gimbal structure;

(j) further comprising linkage means interconnecting said second gimbal structures of said gimbal assemblies to tilt in unison in a transverse direction relative to said frame structure; and, (k) wherein said second interconnection means having means interconnecting both of said gimbal assemblies to said brake means to actuate said brake means by the tilting of one or the other or both of the gimbal assemblies in the longitudinal direction by manual manipulation of one or the other or both of the corresponding first gimbal structures.

4. A recumbent, human powdered vehicle, comprising:

(a) a frame structure having a forward end portion and a rearward end portion;

(b) at least one steerable wheel;

(c) means for rotatably mounting said steerable wheel on said frame structure;

(d) at least one drive wheel rotatably mounted on said frame at a location longitudinally spaced along said frame from said steerable wheel and in constant contact with the ground;

(e) a manually operable drive system drivingly interconnected with said drive wheel;

(f) brake means operably associated with said drive wheel, said brake means including a braking surface rotating with said drive wheel and a friction assembly connected to said frame structure for frictionally engaging said braking surface;

(g) a hand-operable steering and braking gimbal assembly, comprising a hand-graspable, first gimbal structure rotatably interconnected with a second gimbal structure, said second gimbal structure rotatably mounted on said frame structure whereby upon manual manipulation of said first gimbal structure, said gimbal assembly is tiltable laterally relative to said frame structure about an axis extending generally longitudinally relative to said frame structure, and is tiltable in the longitudinal direction relative to said frame structure about an axis extending generally laterally to said frame structure;

(h) first interconnection means operably interconnecting said means for rotatably mounting said steerable wheel on said frame structure to one of said first and second gimbal structures, whereby the steerable wheel is rotated in the direction that said gimbal assembly is laterally tilted upon manual manipulation of said first gimbal structure;

(i) second interconnection means operably connecting said brake means with the other of the first and second gimbal structures, whereby the brake means are actuated upon the tilting of said gimbal assembly in the longitudinal direction upon manual manipulation of said first gimbal structure;

(j) said frame structure comprising an elongate, telescoping center beam assembly including a first, elongate, rectilinear main beam member interconnected with said steerable wheel mounting means and with said drive wheel, and a second, elongate, rectilinear forward beam member telescopically engageable with said main beam member, and means for selectively extending and retracting said main and forward beam members relative to each other and maintaining said main and forward beam members in such selected relative engagement; and, (k) said manually operable drive system including a drive crank assembly having a drive sprocket rotatably mounted on said forward beam member, a driven sprocket in torque transmitting relationship with said drive wheel, a drive chain trained on said drive sprocket to transmit torque between said drive sprocket and said driven sprocket, and resiliently biased means for automatically taking up the slack in said drive chain upon extension and retraction of said center beam assembly.

5. A recumbent, human powered vehicle according to claim 4, wherein said tensioning means comprises:
(a) an idler sprocket trained with said drive chain;
(b) means for mounting said idler sprocket on said forward beam member for movement relative to said drive sprocket; and,
(c) biasing means for imposing a load on said idler sprocket in a direction to impose a desired level of tension on said drive chain.

6. A recumbent, human powered vehicle according to claim 5, wherein said idler sprocket mounting means comprises:
(a) a carriage;
(b) means for rotationally mounting said idler sprocket on said carriage;
(c) guideway means associated with said forward beam member for constraining and guiding said carriage for movement toward and away from said drive sprocket; and,
(d) biasing means for imposing a load on said carriage in the direction away from said drive sprocket.

7. A recumbent, human powered vehicle according to claim 6, wherein said guideway means constrain said carriage for movement along the length of said forward beam member.

8. A recumbent, human powered vehicle according to claim 4, further comprising:
(a) a pair of steerable wheels on opposite sides of said frame structure;
(b) a pair of gimbal assemblies located on laterally opposite sides of said frame structure;
(c) linkage means interconnecting said gimbal assemblies to tilt in unison laterally relative to the length of said frame structure; and,
(d) wherein said second interconnecting means having means interconnecting both of said gimbal assemblies to said brake means to actuate said brake means by the tilting of either or both of said gimbal assemblies in the longitudinal direction upon manual manipulation of either or both corresponding first gimbal structures.

9. A recumbent, human powered vehicle according to claim 4, wherein said means for selectively extending and retracting said main and forward beam members relative to each other comprises a lead screw assembly operably interconnected between said main beam member and said forward beam member, whereupon said lead screw assembly is rotatable in one direction to extend said main and forward beam members relative to each other and is rotatable in the opposite direction to retract said main and forward beam members relative to each other.

10. A recumbent, human powered vehicle according to claim 9, wherein said lead screw assembly is disposed within the interior of said main and forward beam members.

11. A recumbent, human powered vehicle according to claim 4, wherein said drive chain extends through the interior of said main and forward beam members.

12. A recumbent, human powered vehicle according to claim 4, wherein said resiliently based means for automatically taking up a slack of said drive chain is disposed with the interior of said forward beam member.

13. A recumbent, human powered vehicle, comprising:
(a) a frame structure having a forward end portion and a rearward end portion;
(b) at least one steerable wheel;
(c) means for rotatably mounting said steerable wheel on said frame structure;
(d) at least one drive wheel rotatably mounted on said frame at a location longitudinally spaced along said frame from said steerable wheel;
(e) a manually operable drive system drivingly interconnected with said drive wheel;
(f) brake means operably associated with said drive wheel;
(g) a hand-operable steering and braking gimbal assembly, comprising a hand-graspable, first gimbal structure rotatably interconnected with a second gimbal structure, said second gimbal structure rotatably mounted on said frame structure whereby upon manual manipulation of said first gimbal structure, said gimbal assembly is tiltable laterally relative to said frame structure about an axis extending generally longitudinally relative to said frame structure, and is tiltable in the longitudinal direction relative to said frame structure about an axis extending generally laterally to said frame structure;
(h) first interconnection means operably interconnecting said means for rotatably mounting said steerable wheel on said frame structure to one of said first and second gimbal structures, whereby the steerable wheel is rotated in the direction that said gimbal assembly is laterally tilted upon manual manipulation of said first gimbal structure;
(i) second interconnection means operably connecting said brake means with the other of the first and second gimbal structures, whereby the brake means are actuated upon the tilting of said gimbal assembly in the longitudinal direction upon manual manipulation of said first gimbal structure;
(j) wherein said frame structure comprising an elongate, telescoping center beam assembly including a first, elongate, rectilinear main beam member interconnected with said steerable wheel mounting means and with said drive wheel, and a second, elongate, rectilinear forward beam member telescopically engageable with said main beam member, and means for selectively extending and retracting said main and forward beam members relative to each other and maintaining said main and forward beam members in such selected relative engagement;
(k) wherein said manually operable drive system including a drive crank assembly having a drive sprocket rotatably mounted on said forward beam member, a driven sprocket in torque transmitting relationship with said drive wheel, a drive chain trained on said drive sprocket to transmit torque between said drive sprocket and said driven sprocket, and resiliently biased tensioning means for automatically taking up the slack in said drive chain upon extension and retraction of said center beam assembly;
(l) wherein said tensioning means comprise: an idler sprocket trained with said drive chain, means for mounting said idler sprocket on said forward beam member for movement relative to said drive sprocket; and, biasing means for imposing a load on said idler sprocket in a direction to impose a desired level of tension on said drive chain; and, (m) wherein said idler sprocket mounting means comprises: a carriage disposed within the interior of said forward beam member; means for rotatably mounting said idler sprocket on said carriage; guideway means associated with said forward beam member for constraining and guiding said carriage for movement toward and away from said drive sprocket; and, biasing means for imposing a load on said carriage in the direction away from said drive sprocket.

14. A recumbent, human powered vehicle, comprising:
(a) a frame structure having an elongate, telescoping center beam assembly including a first, elongate main beam member and a second elongate forward beam member telescopically engageable with said main beam member, and means for selectively extending and retracting said main and forward beam members relative to each other;
(b) at least one steerable wheel and means for mounting said steerable wheel on said main beam member;
(c) at least one drive wheel rotatably mounted on said main beam member at a location longitudinally spaced along said main beam member from said steerable wheel for constant contact with the ground;
(d) a manually operable drive system drivingly interconnected with said drive wheel, said drive system including a drive crank assembly having a drive sprocket and crank pedals rotatably mounted on said forward beam member, a driven sprocket in torque transmitting relationship with said driven wheel, a drive chain trained on said drive sprocket to transmit torque between said drive sprocket and said driven sprocket, and resiliently biased tensioning means for automatically taking up the slack in said drive chain upon extension and retraction of said center beam assembly;
(e) brake means operably associated with said drive wheel, said brake means including a braking surface rotating with the rotation of said drive wheel and a friction assembly connected to said frame structure and frictionally engageable with said braking surface;
(f) at least one hand-operable steering and braking gimbal assembly, comprising a hand-graspable, first gimbal structure rotatably connected with a second gimbal structure, said second gimbal structure rotatably mounted on said frame whereby upon manual manipulation of said first gimbal structure, said gimbal assembly is tiltable in the lateral direction relative to said frame structure about an axis extending generally longitudinally relative to said main beam member and is tiltable in the longitudinal direction relative to said frame structure about an axis extending generally transversely to said main beam member;
(g) first interconnection means operably connecting said means for rotatably mounting said steerable wheel on said frame structure to one of said first and second gimbal structures, whereby said steerable wheel is rotated in the direction that said gimbal assembly is laterally tilted upon manual manipulation of said first gimbal member; and,
(h) second interconnection means operably connecting the brake means with the other of said first and second gimbal members, whereby said brake means are actuated upon the tilting of said gimbal assembly in the longitudinal direction upon manual manipulation of said first gimbal member.

15. A recumbent, human powered vehicle according to claim 14, further comprising:
(a) a pair of gimbal assemblies located at laterally opposite sides of said frame structure;
(b) linkage means interconnecting said two gimbal assemblies to tilt in unison in a transverse direction relative to said frame structure; and,
(c) wherein said second connection means includes means interconnecting both of said gimbal assemblies to said brake means to actuate said brake means by the individual tilting of either of said gimbal assemblies in the longitudinal direction upon manual manipulation of a corresponding first gimbal structure of the selected gimbal assembly.

16. A recumbent, human powered vehicle according to claim 14, wherein said means for selectively extending and retracting said main and forward beam members relative to each other includes a lead screw assembly operably interconnected between said main beam member and said forward beam member, whereupon rotation of said lead screw assembly in a first direction causes extension of the main and forward beam members relative to each other and rotation of said lead screw assembly in the opposite direction causes a retraction of said main and forward beam members relative to each other.

17. A recumbent, human powered vehicle according to claim 16, wherein said lead screw assembly is disposed within the interior of said main and forward beam members.

18. A recumbent, human powered vehicle according to claim 14, wherein said drive chain extends through the interior of said main and forward beam members.

19. A recumbent, human powered vehicle according to claim 18, wherein said resiliently biased means for automatically taking up a slack of said drive chain is disposed within the interior of said forward beam member.

* * * * *

UNITED STATES PATENT AND TRADEMARK OFFICE
CERTIFICATE OF CORRECTION

PATENT NO. : 5,069,469

DATED : December 3, 1991

INVENTOR(S) : Brent L. Rosengrant et al.

It is certified that error appears in the above-identified patent and that said Letters Patent is hereby corrected as shown below:

| COLUMN | LINE | |
|---|---|---|
| 2 | 3 | after "rider." start a new paragraph with --Another-- |
| 2 | 24 | "including" should read --include-- |
| 3 | 51 | "elongated" should read --elongate-- |
| 7 | 15 | "pushed forwardly agains" should read --pushes forwardly against-- |
| 8 | 13 | "plate 42" should read --plate 52-- |
| 8 | 24 | "nontublar" should read --nontubular-- |
| 9 | 62 | "gumbal" should read --gimbal-- |
| 10 | 3 | "handle 180" should read --handles 180-- |
| 10 | 19 | "ball joint" should read --gimbal-- |
| 10 | 21 | "Gimbal" should read --Ball joint-- |
| 11 | 35 | "wheel," should read --wheels,-- |
| 11 | 68 | "tile" should read --tilt-- |
| 12 | 43 | "longitudinally" should read --longitudinal-- |
| 13 | 10 | "powdered" should read --powered-- |
| 13 | 24 | "brake surface" should read --braking surface-- |
| 13 | 27 | "brake surface" should read --braking surface-- |
| 14 | 4 | "powdered" should read --powered-- |
| 15 | 4 | "comprises" should read --comprise-- |
| 15 | 63 | "based" should read --biased-- |
| 15 | 65 | "with" should read --within-- |

UNITED STATES PATENT AND TRADEMARK OFFICE
CERTIFICATE OF CORRECTION

PATENT NO. : 5,069,469
DATED : December 3, 1991
INVENTOR(S) : Brent L. Rosengrant et al It is certified that error appears in the above-identified patent and that said Letters Patent is hereby corrected as shown below:

<u>Col.</u>    <u>Line</u>

17      1 & 2    "comprises" should read --comprise--.

Signed and Sealed this

Twentieth Day of July, 1993

Attest:

MICHAEL K. KIRK

Attesting Officer    Acting Commissioner of Patents and Trademarks